United States Patent [19]
Reed

(10) Patent No.: US 6,583,753 B1
(45) Date of Patent: Jun. 24, 2003

(54) VEHICLE BACK-UP AND PARKING AID RADAR SYSTEM

(75) Inventor: John Christopher Reed, Port Hueneme, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/115,770

(22) Filed: Apr. 3, 2002

(51) Int. Cl.$^7$ ............................................. G01S 13/93

(52) U.S. Cl. ............................ 342/70; 342/71; 342/72; 340/436; 340/437; 340/903

(58) Field of Search ............................ 342/70, 71, 72, 342/69, 95, 96, 118; 340/435, 436, 437, 903; 701/301

(56) References Cited

U.S. PATENT DOCUMENTS

| | | | | |
|---|---|---|---|---|
| 6,509,863 B2 | * | 1/2003 | Zoratti et al. ................. | 342/70 |
| 2002/0011928 A1 | * | 1/2002 | Williams ..................... | 340/436 |
| 2002/0067287 A1 | * | 6/2002 | Delcheccolo et al. ........ | 340/901 |

OTHER PUBLICATIONS

"Modeling the performance of automotive bumper mounted antennas", Marhefka, R.J.; Baertlein, B.A.; Rao, M.; Prakah–Asante K.; Antennas and Propagation Society International Symposium, 2002. IEEE ,pp.: 316–319 vol. 3.*
"Selection of range and azimuth angle parameters for a forward looking collision warning radar sensor", Kenue, S.K.; Intelligen Vehicles '95 Symposium., Proceedings of the , Sep. 25–26, 1995 pp.: 494–499.*
"A multistatic microwave radar sensor for short range anti-collision warning", Giubbolini, L.; Vehicular Technology, IEEE Transactions on , vol.: 49 Issue: 6 , Nov. 2000 pp.: 2270–2275.*

* cited by examiner

Primary Examiner—John B. Sotomayor
(74) Attorney, Agent, or Firm—Robert M. Sigler

(57) ABSTRACT

An improved vehicle radar system and control aids the vehicle driver during both parking and back-up maneuvers. The radar system is equipped with both long range and short range radar detection antennas, an RF switch for selecting the active antenna, and a range bin having a depth that is adjustable "on the fly". The back-up aid function is provided by activating the RF switch to select the long range antenna and setting the range bin to a relatively large depth to cover the long range in a short time. The parking aid function is provided by activating the RF switch to select the short range antenna, and setting the range bin to a relatively short depth to achieve high close range accuracy.

4 Claims, 2 Drawing Sheets

VEHICLE BACK-UP AND PARKING AID RADAR SYSTEM

TECHNICAL FIELD

This invention relates to automotive radar systems of the type in which the detection range is divided into multiple contiguous range bins, and more particularly to a radar control that provides both back-up aid and parking aid functions.

BACKGROUND OF THE INVENTION

Object detection and ranging systems have been applied to motor vehicles for aiding the driver when the vehicle is being operated in reverse. A first type of system, generally referred as a back-up aid, is designed to aid the driver by detecting foreign or unexpected objects in the path of the vehicle; in this type of system, the detection range must be relatively extensive, but the ranging accuracy can be relatively coarse. A second type of system, generally referred to as a parking aid, is designed to aid the driver by indicating how close the rear bumper is to an object such as another vehicle during parking maneuvers; in this type of system, the detection range can be relatively shallow but must also be relatively wide, and the ranging accuracy needs to be relatively fine. Since the design requirements of parking aids and back-Lip aids are so different, it has been considered impossible to provide both functions with a single non-scanning radar sensor. Thus, the current trend is to equip the vehicle with a radar sensor for the back-up aid function, and with a series of lower cost ultrasonic sensors for the parking aid function. However, it would be desirable from the standpoint of both cost and performance to be able to achieve both parking and back-up aid functions with a single radar system.

SUMMARY OF THE INVENTION

The present invention is directed to an improved vehicle radar system and control for aiding the vehicle driver during both parking and back-up maneuvers. According to the invention, the radar system is equipped with both long range and short range radar detection antennas, an RF switch for selecting the active antenna, and a range bin having a depth that is adjustable "on the fly". The back-up aid function is provided by activating the RF switch to select the long range antenna and setting the range bin to a relatively large depth to cover the long range in a short time. The parking aid function is provided by activating the RF switch to select the short range antenna, and setting the range bin to a relatively short depth to achieve high close range accuracy.

DESCRIPTION OF THE PREFERRED EMBODIMENT

Figure 1:
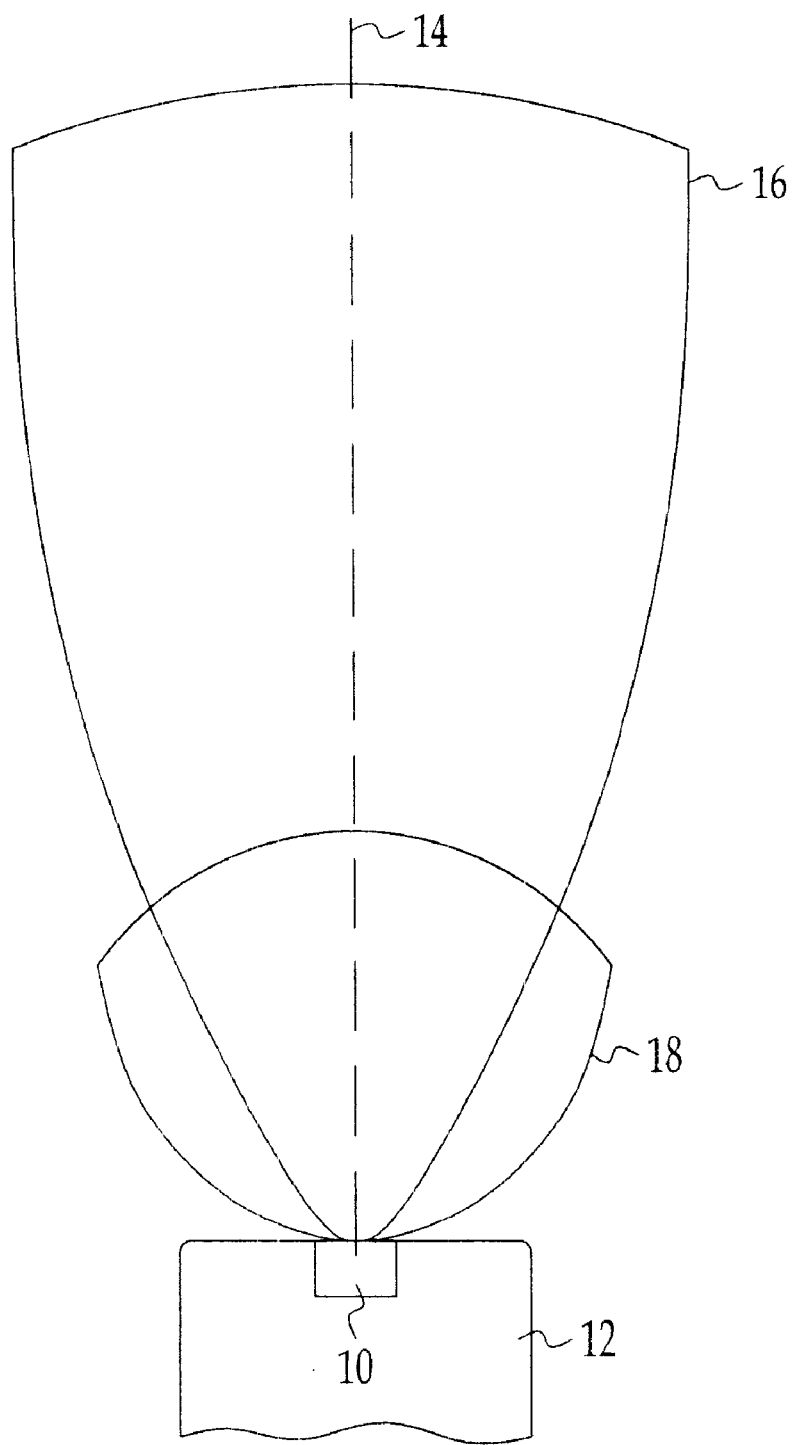
FIG. 1 schematically depicts a motor vehicle and radar detection patterns for achieving back-up and parking aid functions according to this invention.

Referring to the drawings, and more particularly to FIG. 1, the reference numeral 10 generally designates a radar system installed in a motor vehicle 12 to perform both parking and back-up aids for the vehicle driver. The system 10 illuminates or radiates radar energy to the rear of the vehicle 12 and receives radar energy returned from objects in a detection area. As explained below in detail, the system 10 includes first and second antennas (also referred to herein as long and short range antennas) for receiving the returned radar energy, each such antenna being designed to receive radar energy in particular pattern within the illuminated region. The receive antennas receive radar energy in characteristic patterns that in the usual case are laterally symmetrical about the central axis 14. The first or long range antenna is sensitive to radar energy in a long range pattern as generally depicted by the reference numeral 16 for use in performing the back-Lip aid function, whereas the second or short range antenna is sensitive to radar energy in a short range pattern as generally depicted by the reference numeral 18 for use in performing the parking aid function. In a typical mechanization, for example, the pattern 16 supports a detection range of 0.0–6.0 meters and the pattern 18 supports a detection range of 0.0–1.4 meters, the pattern 18 having much wider coverage in the immediate vicinity of tile vehicle 12.

Figure 2:
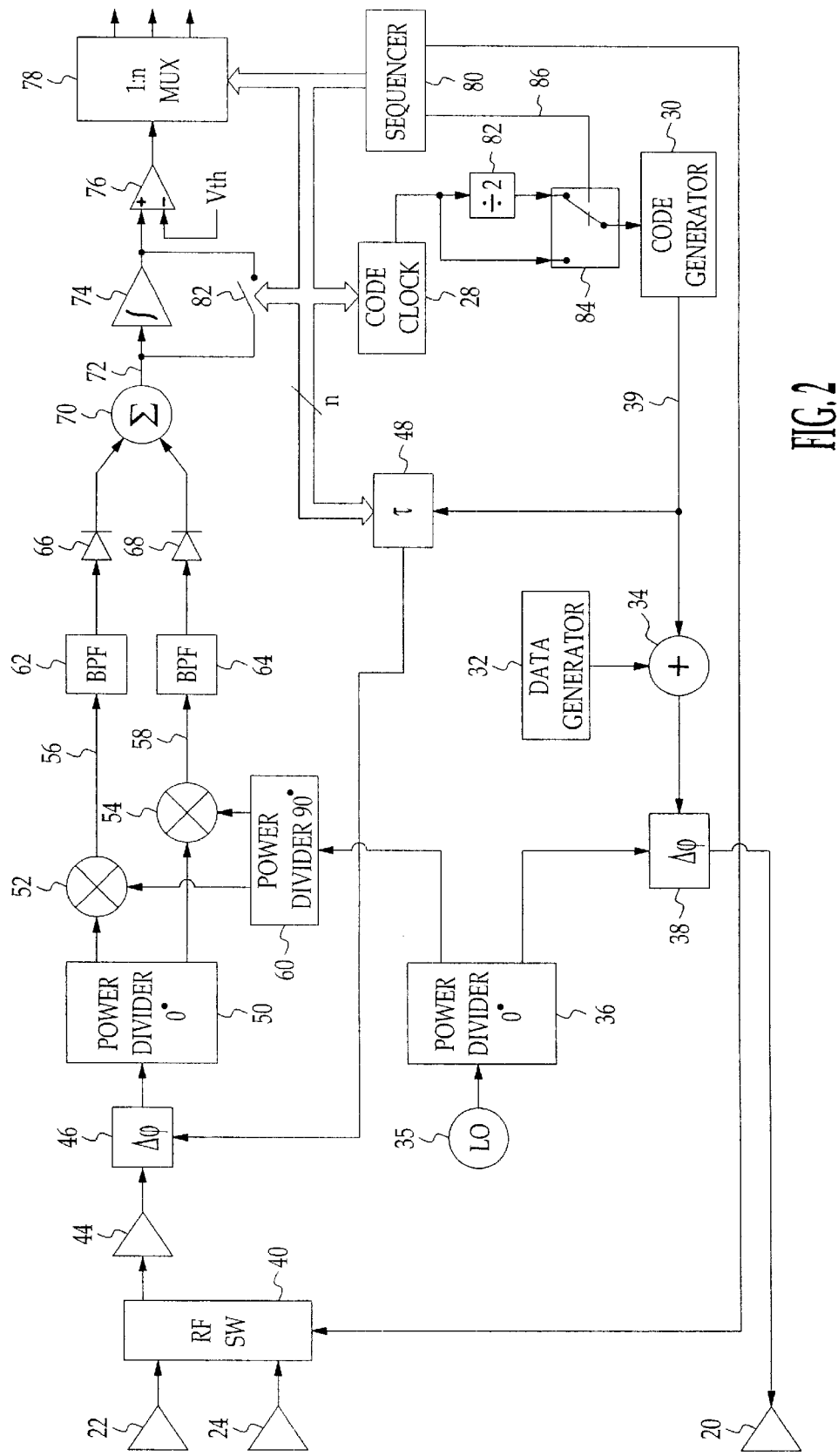
FIG. 2 is a block diagram of a radar system that develops and utilizes radar detection patterns as depicted in FIG. 1 for providing back-up and parking aid functions according to this invention.

FIG. 2 depicts tile radar system 10 in block diagram form. The transmitting antenna for illuminating the area to the rear of the vehicle 12 is designated by the reference numeral 20, and the long range and short range receiving antennas are designated by the reference numerals 22 and 24, respectively. In general, tile detection range of each of tile antennas 22, 24 is subdivided into a number of contiguous regions of increasing range relative to the vehicle 12, and a range bin of a given depth is scanned in range to cover the respective regions. According to this invention, however, the range bin used to scan the detection region of the long range antenna 22 is deeper than the range bin used to scan the detection region of the short range antenna 24. In this way, both patterns may be scanned in a similar amount of time, the relatively deep range bin used to scan detection region of long range antenna 22 provides acceptable ranging accuracy for the back-up aid function, and the relatively shallow range bill used to scan the detection region of short range antenna 24 provides acceptable ranging accuracy for the parking aid function. For example, the long range antenna 22 may be scanned with a 20 centimeter range bin to limit back-LIP aid ranging error to 10 centimeters or less, and the short range antenna 24 may be scanned with a 10 centimeter range bin to limit parking aid ranging error to 5 centimeters or less.

Referring specifically to FIG. 2, the transmitter antenna 20 is coupled to a transmitter circuit 26 including a code clock 28, a code generator 30, a data generator 32, an Exclusive-OR gate 34, a Local Oscillator (LO) 35, a 0° Power Divider 36 and a controlled phase modulator circuit (ΔØ) 38. Briefly, code generator 30, under control of code clock 28, generates a maximal length pseudo-noise ranging code on line 39, which is mixed with the output of data generator 32 by Exclusive-OR gate 34. The output of Local Oscillator 35, split by Power Divider 36, is applied as an input to phase modulator 38, which modulates the oscillator signal in accordance with the output of Exclusive-OR gate 34.

The receive antennas 22, 24 are coupled to a radio frequency switch (RF-SW) 40 that couples the signal output of a selected receiver antenna to a receiver circuit 42 that demodulates and integrates a portion of the received signal corresponding to a selected range bin to determine the presence of any objects therein. The Output of RF-SW 40 is initially coupled to a low noise amplifier (LNA) 44, and then applied as an input to the controlled phase modulator (ΔØ)

46, which modulates the received signal with the output of code generator 30, as variably delayed by programmable delay unit 48. The delay imposed by delay unit 48 corresponds to the time of flight delay associated with an object to be detected in a selected range bin, and if the received signal matches that time delay, the output of phase modulator 46 will contain the data stream of data generator 32, modulated on a carrier wave at the frequency of the Local Oscillator 35. The Output of phase modulator 46 is then split by 0° Power Divider 50, and applied to the I and Q demodulators 52 and 54, which reproduce the data on lines 56 and 58, through the operation of 90° Power Divider 60, which splits and phase shifts the Output of Local Oscillator 35. The data signals on lines 56, 58 are then amplified and band-pass filtered by blocks 62, 64 to extract the fundamental frequency of the data stream, envelope detected by diodes 66, 68, and then summed at summing junction 70 to form a DC signal on line 72 corresponding to the amplitude of radar illumination reflected from one or more objects in the selected range bin. The signal on line 72 is then integrated by integrator 74, and compared to a threshold level (THR) by comparator 76 to determine if there is an object in the selected range bin. A 1:n multiplexer 78 directs the comparator Output to a suitable register for further processing.

In addition to the above-described elements, the radar system 10 includes a sequencer 80 coupled to the delay unit 48, an integrator reset switch 82, the code clock 28, multiplexer 78 and RF-SW 40. The sequencer 80 is microprocessor based, and controls the operation of such elements to select an appropriate range bin and to scan such range bin to detect the presence and range of one or more objects in the desired detection region. In general, process carried out by sequencer 80 involves closing reset switch 82, adjusting the code signal delay of delay unit 48 to change the range bin position, starting a dwell timer, and re-opening the reset switch 82 to permit integrator 74 to integrate the signal on line 72. When the dwell timer reaches the retrieved dwell time, the multiplexer 78 is controlled to save the output of comparator 76, and the process repeated until the entire detection region of the received signal has been scanned. See, for example, the U.S. Pat. No. 5,731,781, issued on Mar. 24, 1998, and incorporated herein by reference.

In implementing the present invention, the sequencer 80 additionally controls RF-SW 40 to select the long or short range antenna 22, 24, and controls the pseudo-noise ranging code to select the corresponding range bin. In the illustrated embodiment, the output frequency of code clock 28 is designed to produce a 10 centimeter range bin for the parking aid function, and the range bin is doubled to 20 centimeters for the back-up aid function by passing the output of code clock 28 through the divide-by-two circuit 82 before applying it to code generator 30. To this end, the sequencer 80 controls the operation of switch 84 via line 86 to select the appropriate range bin size. Alternatively, of course, the code clock 28 or code generator 30 may be programmable to enable "on-the-fly" selection of the range bin size by sequencer 80. In a typical implementation, the parking and back-up aids are enabled whenever the reverse transmission range of the vehicle 12 is selected, and sequencer 80 is preferably operated to periodically switch between the back-up aid and parking aid modes of operation so that both functions are provided at essentially the same time. Alternatively, the functionality may be selected based on the reverse speed of the vehicle, with the parking aid being activated at very low speeds, and the back-up aid being activated at higher speeds. In any event, the single radar system 10 achieves both back-up aid and parking aid functions, contributing to a cost effective and high performance configuration.

While described in reference to the illustrated embodiments, it is expected that various modifications in addition to those mentioned above will occur to those skilled in the art. For example, two or more systems may be applied to a vehicle if desired to extend the overall lateral detection range. Additionally, it will be understood that the various system parameters disclosed herein are exemplary, and may be adjusted as required to satisfy the requirements of a given installation. Accordingly, it will be understood that the scope of this invention is not limited to the illustrated embodiments and that systems and methods incorporating such modifications may fall within the scope of this invention, which is defined by the appended claims.

What is claimed is:

1. A vehicle radar system for detecting objects within a detection range defined with respect to the vehicle, the system comprising:

means for illuminating the detection range with radar energy;

first and second antennas for receiving radar energy reflected back toward the vehicle by objects disposed within the detection range, the first antenna being configured to produce a first output signal indicating radar energy in a long range pattern that extends to a length dimension of said detection range, and said second antenna being configured to produce a second output signal indicating radar energy in a short range pattern in proximity to the vehicle;

a radar receive circuit for processing a selected one of said first and second output signals by detecting the indicated radar energy in each of a plurality of contiguous range bins within the respective antenna pattern to determine object range, said range bins having a depth dimension that is configurable on the fly;

a switching device for selectively coupling one of said first and second output signals to said radar receive circuit; and control means effective in a first mode of operation for activating said switching device to couple the first output signal produced by said first antenna to said receive circuit while configuring the depth dimension of said range bins to a first value suitable to a desired range resolution for said long range pattern, and in a second mode of operation for activating said switching device to couple the second output signal produced by said second antenna to said receive circuit while configuring the depth dimension of said range bins to a second value suitable to a desired range resolution for said short range pattern.

2. The vehicle radar system of claim 1, wherein the second value of said range bin depth is smaller than said first value to provide increased range resolution for said short range pattern, relative to said long range pattern.

3. The vehicle radar system of claim 2, wherein:

said detection range is defined with respect to a rear portion of the vehicle;

said first mode of operation provides a back-up aid to a driver of the vehicle; and said second mode of operation provides a parking aid to the driver of the vehicle.

4. The vehicle radar system of claim 3, wherein the control means alternates between said first and second modes of operation when said vehicle is being driven in a reverse range.

* * * * *